C. S. MARTIN.
Carriage-Spring.
No. 41,520. Patented Feb. 9, 1864.
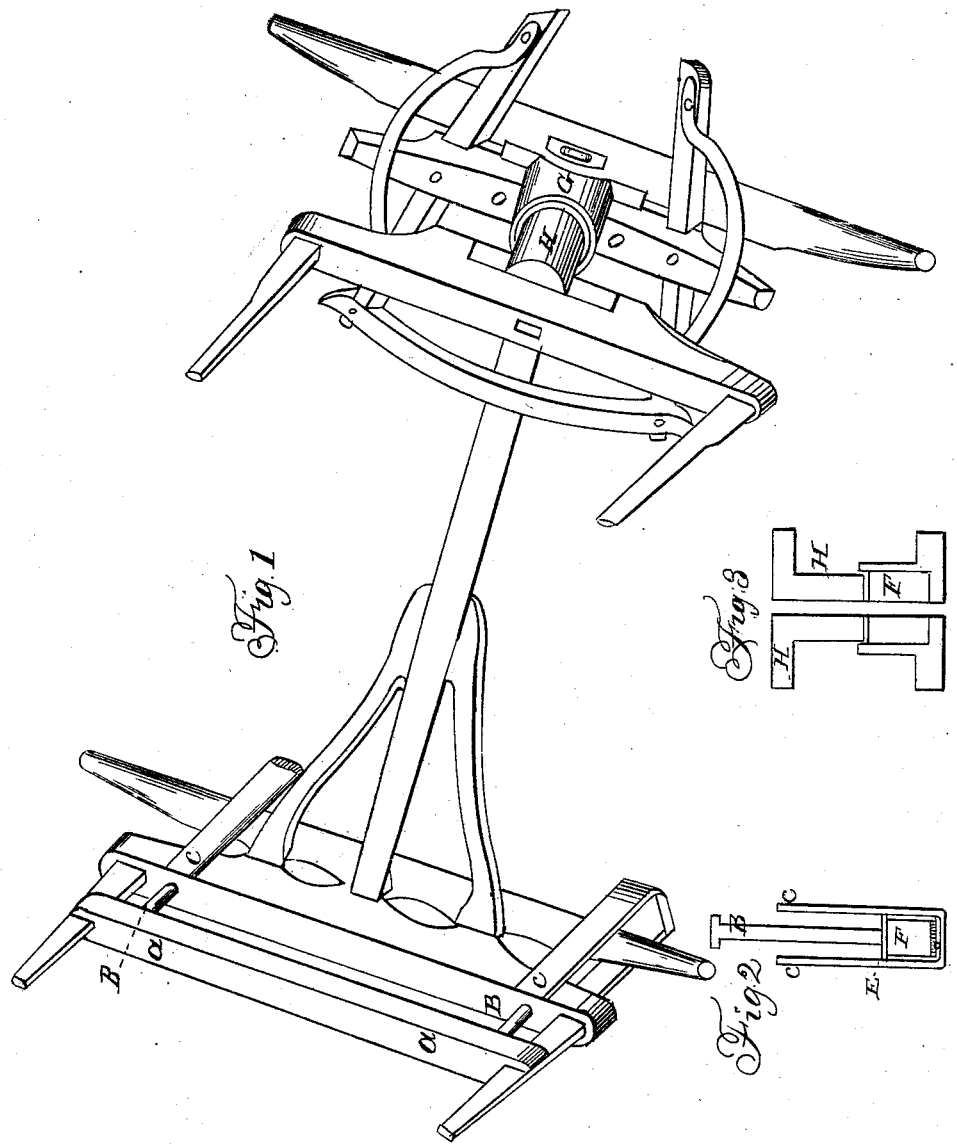
Witnesses
J. J. Prosser
P. H. Hoyne
Inventor:
Charles S. Martin

UNITED STATES PATENT OFFICE.

CHARLES S. MARTIN, OF MACKFORD, WISCONSIN.

IMPROVEMENT IN WAGON-SPRINGS.

Specification forming part of Letters Patent No. 41,520, dated February 9, 1864.

*To all whom it may concern:*

Be it known that I, CHARLES S. MARTIN, of the town of Mackford, in the county of Green-Lake and State of Wisconsin, have invented a new and Improved Mode of Applying Springs to Wagons; and I do declare that the following is a full and exact description thereof, reference being had to the accompanying drawings, and to the letters of reference marked thereon, in which—

Figure 1 is a perspective view of the running-gear of a common lumber-wagon with my improvement attached. Fig. 2 is a plan section of the hind spring and the means of applying it. Fig. 3 is a plan section of the forward spring and couplings by which it is attached.

The nature of my invention consists in the manner of applying rubber springs to wagons, which, it will be seen, I accomplish in a cheap and durable manner.

To enable others skilled in the art to make and use my invention, I will proceed to describe its construction and operation.

I construct my wagons in any of the well-known forms, and in most cases apply three rubber springs, two of them to the hind axle and one of them to the forward axle.

In applying the springs to the hind axle I make use of the spring-bar A, the two bolts B B, the clasp or hanger C, the cup D, the washer E, and rubber F. The object of the bar A, which rests on the bolts B B, is to receive the box or load and to be the means of transmitting the elasticity of the spring thereto.

The bolts B B, on which the bar A rests, pass through the bolster and axle and rest on the washer E, which is placed on the rubber F. It will be seen by this arrangement that the bolts are retained in their proper places by the axle and bolster.

The clasp or hanger C is firmly attached to the bolster and axle, and serves as the means of holding the spring F. The cup D is placed in the clasp or hanger C and serves to retain the rubber F in its place. The washer E is placed inside of the clasp C, and rests upon the rubber F, and receives the ends of the bolts B B.

The forward spring is placed in a coupling, H, which is formed by two separate pieces, one attached to the center of the axle in form of a cup, G, and one attached to the center of the bolster and in form of a piston. A bolt passes through the bolster, couplings, spring, and axle, and is confined in its place below the axle.

It will be seen by this arrangement that I attach a good durable spring to a wagon in such a manner as to be out of the way, and to fully answer the purpose of other more cumbersome and expensive springs.

After thus fully describing my invention, what I claim as new, and desire to secure by Letters Patent, is –

1. The combination of the spring-bar A, bolts B B, clasp or hanger C, cup D, and washer E, in the manner and for the purpose herein described.

2. In combination with the foregoing, the couplings F and G, in the manner and for the purpose herein described.

CHARLES S. MARTIN.

Witnesses:
T. T. PROSSER,
P. A. HOYNE.